United States Patent
Kim et al.

(10) Patent No.: US 11,383,682 B2
(45) Date of Patent: Jul. 12, 2022

(54) ORGAN-TYPE ELECTRONIC BRAKE PEDAL APPARATUS

(71) Applicants: HYUNDAI MOTOR COMPANY, Seoul (KR); KIA CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA CORPORATION, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 17/325,837

(22) Filed: May 20, 2021

(65) Prior Publication Data
US 2022/0144223 A1    May 12, 2022

(30) Foreign Application Priority Data

Nov. 9, 2020  (KR) .................. 10-2020-0148480

(51) Int. Cl.
*G05G 1/30* (2008.04)
*B60T 7/04* (2006.01)
*B60T 7/06* (2006.01)

(52) U.S. Cl.
CPC ................ *B60T 7/042* (2013.01); *B60T 7/06* (2013.01)

(58) Field of Classification Search
CPC .... B60T 7/04; B60T 7/06; G05G 1/30; G05G 1/38; G05G 1/44; G05G 1/445; B60K 26/021
See application file for complete search history.

(56) References Cited

U.S. PATENT DOCUMENTS

| | | | |
|---|---|---|---|
| 6,318,208 B1 * | 11/2001 | Thongs, Jr. | G05G 1/38 74/513 |
| 10,401,896 B1 | 9/2019 | Kim et al. | |
| 10,946,741 B1 * | 3/2021 | Kim | B60T 7/06 |
| 10,994,611 B1 * | 5/2021 | Kim | G05G 5/28 |

(Continued)

FOREIGN PATENT DOCUMENTS

| | | | |
|---|---|---|---|
| DE | 102015214634 A1 | 2/2017 | |
| GB | 360042 A * | 8/1930 | G05G 1/30 |

(Continued)

OTHER PUBLICATIONS

Machine Translation of WO 2020/254368.*

*Primary Examiner* — Richard W Ridley
*Assistant Examiner* — Brian J McGovern
(74) *Attorney, Agent, or Firm* — Lempia Summerfield Katz LLC

(57) ABSTRACT

An organ-type electronic brake pedal apparatus enables a pedal pad to be manipulated when a driver tries to manipulate the pedal pad by rotating his/her foot in the manner of manipulating an organ-type pedal or when the drivers tries to manipulate the pedal pad by stretching his/her foot forwards in the manner of manipulating a pendant-type pedal. The organ-type electronic brake pedal apparatus inhibits the pedal pad from being manipulated when the driver tries to manipulate a pedal arm part, which is positioned close to a hinge pin of the pedal pad.

10 Claims, 7 Drawing Sheets

(56) References Cited

U.S. PATENT DOCUMENTS

| | | |
|---|---|---|
| 11,021,058 B1 * | 6/2021 | Kim .................... G05G 1/38 |
| 11,249,506 B1 * | 2/2022 | Kim .................... B60T 7/042 |
| 2004/0045393 A1 | 3/2004 | Deforest |
| 2007/0157755 A1 | 7/2007 | Kim et al. |
| 2011/0094331 A1 | 4/2011 | Kim et al. |
| 2011/0197700 A1 | 8/2011 | Oneill |
| 2012/0216652 A1 | 8/2012 | Yamazaki et al. |
| 2013/0087009 A1 | 4/2013 | Stewart et al. |
| 2019/0278318 A1 | 9/2019 | Park et al. |
| 2020/0001711 A1 | 1/2020 | Burke et al. |
| 2020/0293079 A1 | 9/2020 | Kang et al. |
| 2022/0009349 A1 | 1/2022 | Nagashima |
| 2022/0048384 A1 * | 2/2022 | Kim .................... G05G 1/42 |
| 2022/0055477 A1 * | 2/2022 | Kim .................... B60K 26/021 |

FOREIGN PATENT DOCUMENTS

| | | | | |
|---|---|---|---|---|
| KR | 10-2020-0070946 A | 6/2020 | | |
| WO | WO-2020180141 A1 * | 9/2020 | ............... | G05G 1/30 |
| WO | WO-2020254368 A1 * | 12/2020 | ............... | G05G 5/03 |

* cited by examiner

FORWARDS ←    → REARWARDS (TOWARD DRIVER)

ORGAN-TYPE ELECTRONIC BRAKE PEDAL APPARATUS

CROSS-REFERENCE TO RELATED APPLICATION

This application claims priority to and the benefit of Korean Patent Application No. 10-2020-0148480, filed on Nov. 9, 2020, the entire contents of which are incorporated herein by reference.

FIELD

The present disclosure relates to an organ-type electronic brake pedal apparatus, and more particularly to an organ-type electronic brake pedal apparatus adapted to eliminate a risk of incorrect operation when a driver tries to manipulate the pedal pad.

BACKGROUND

The statements in this section merely provide background information related to the present disclosure and may not constitute prior art.

In general, brake pedal apparatuses for a vehicle may be classified into a pendant-type brake pedal, which is suspended from a dashboard, and an organ-type brake pedal, which is mounted on a floor panel, depending on a mounting structure.

In the pendant-type brake pedal, because the center of rotation of the pedal pad is positioned at an upper level, the brake pedal is manipulated by pressing a lower portion of the pedal pad or by pushing the lower portion of the pad forwards using a driver's foot. Meanwhile, in the organ-type brake pedal, because the center of rotation of the pedal pad is positioned at a lower level, the brake pedal is manipulated by rotating an upper portion of the pedal pad forwards using a driver's foot.

Because the organ-type brake pedal apparatus is constructed such that the pedal pad, on which a driver's foot is placed, has a larger area and the motion trajectory of the pedal pad is similar to the motion trajectory of the driver's foot, it is possible to improve the operating sensation of the brake pedal apparatus. Accordingly, the organ-type brake pedal apparatus has an advantage of being more conveniently manipulated than the pendant-type brake pedal apparatus.

However, we have discovered that since a driver who is accustomed to the pendant-type brake pedal manipulates a lower portion of the organ-type pedal pad, at which the center of rotation of the pedal pad is positioned, and the driver pushes the organ-type pedal pad forwards. When the organ-type pedal pad is manipulated like the pendant-type pedal pad in either of the above-mentioned manners, there is a disadvantage of incorrect operation because the pedal pad is not moved.

Details described as the background art are intended merely for the purpose of promoting understanding of the background of the present disclosure, and should not be construed as an acknowledgment of the prior art that is previously known to those of ordinary skill in the art.

SUMMARY

The present disclosure provides an organ-type electronic brake pedal apparatus, which permits a pedal pad to be manipulated when a driver manipulates the pedal pad by rotating his/her foot in the manner of manipulating an organ-type pedal or when the drivers pushes the pedal pad forwards using his/her foot in the manner of manipulating a pendant-type pedal but inhibits the pedal pad from being manipulated when the driver tries to manipulate a portion of the pedal pad that is positioned close to the hinge of the pedal pad, as in the pendant-type brake pedal, thereby improving the reliability of operation of the brake pedal by the driver and preventing incorrect operation of the brake pedal.

In one form of the present disclosure, an organ-type electronic brake pedal apparatus includes: a pedal housing fixedly mounted in a space under a driver seat; a pedal pad, which is coupled at a lower end thereof to the pedal housing via a hinge pin so as to be rotatable forward and backward; a pad surface adapted to be manipulated by a driver's foot; and a high-load spring module which includes a first end rotatably coupled to the pedal housing and a second end rotatably coupled to the pedal pad so as to realize resisting force corresponding to force applied to the pedal pad. In particular, the pad surface is spaced apart upwards from the hinge pin, and when the pedal pad is rotated rearwards about the hinge pin and is projected from the pedal housing, only the portion of the pedal pad that is provided with the pad surface is projected from the pedal housing.

The organ-type electronic brake pedal apparatus may further include a plurality of pedal sensors, which are fixedly mounted on the pedal housing and are connected to the pedal pad so as to generate signals pertaining to braking upon rotation of the pedal pad.

In one form, the pedal pad may include: a pad part including the pad surface and an opening through which the second end of the high-load spring module is inserted and rotatably coupled to the pad part; and a linear pedal arm part, which extends from the pad part and is coupled at a lower end thereof to the hinge pin.

A sensor pin may be coupled to the pedal arm part at a position between the pad part and the hinge pin, and may be coupled to sensor levers of the pedal sensors.

The opening of the pad part may be disposed only at a front face thereof, into which the high-load spring module is inserted, and the pad part may be closed at remaining area thereof so as to prevent the entry of contaminants.

Upper and lower surfaces of the pad part may be formed so as to have arc shapes, which are respectively the same as sections of circles having radii of rotation around the hinge pin.

The pad part may extend through a housing hole formed in the pedal housing so as to be inserted into or projected from the pedal housing when the pedal pad is rotated, and the pedal arm part may be positioned inside the pedal housing regardless of rotation of the pedal pad so as to prevent contact with a driver.

The pedal pad may be constructed such that a vertical length between an axis of the hinge pin and an upper end of the pedal arm part is greater than a vertical length of the pad part.

A rear surface of the pedal housing may include an upper sloped surface, which is bent downwards at a rear end of an upper surface of the pedal housing at a predetermined angle and has formed therein a housing hole through which the pad part extends, and a lower sloped surface, which is inclined at the lower end of the upper sloped surface at a predetermined angle and is connected to the bottom surface of the pedal housing, wherein the upper sloped surface is connected to the upper surface at an obtuse angle, and the lower sloped surface is connected to the upper sloped surface at an obtuse angle and is connected to the bottom surface at an acute angle.

The pedal arm part may be connected to the pad part such that the pedal arm part is inclined at an angle equal to the angle of the lower sloped surface so as to be parallel to the lower sloped surface when the pedal pad is rotated rearwards and the pad part is thus projected from the pedal housing and such that the pedal arm part defines an acute angle relative to the upper sloped surface when the pedal pad is rotated in the state in which one end of the high-load spring module disposed in the pad part does not interfere with the pad part.

The pedal arm part may be connected to the pad part such that an included angle between the pedal arm part and the upper sloped surface is an angle of 45 degrees or less.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
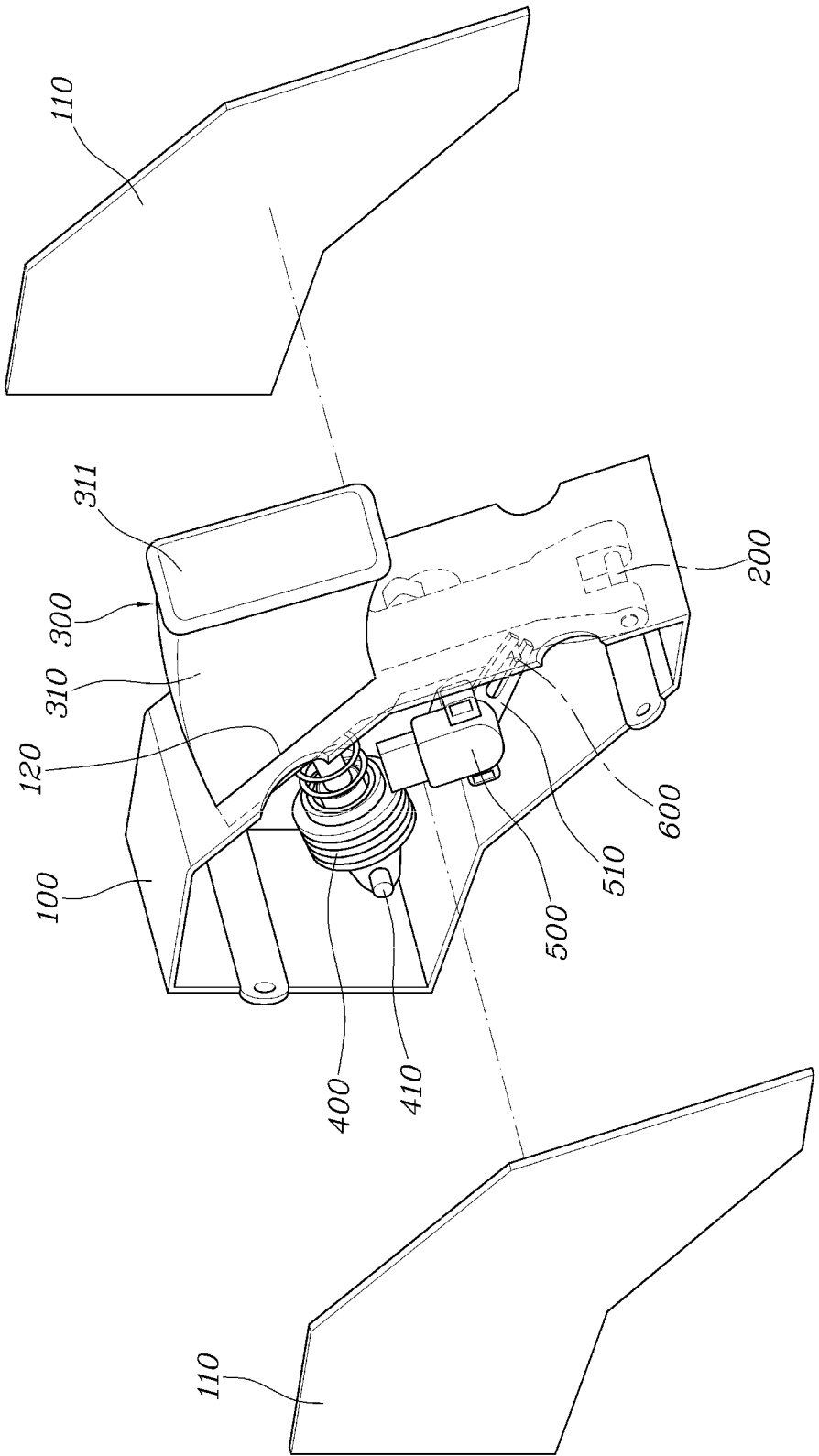
FIG. 1 is an exploded perspective view of the organ-type electronic brake pedal apparatus according to one form of the present disclosure.
Figure 2:
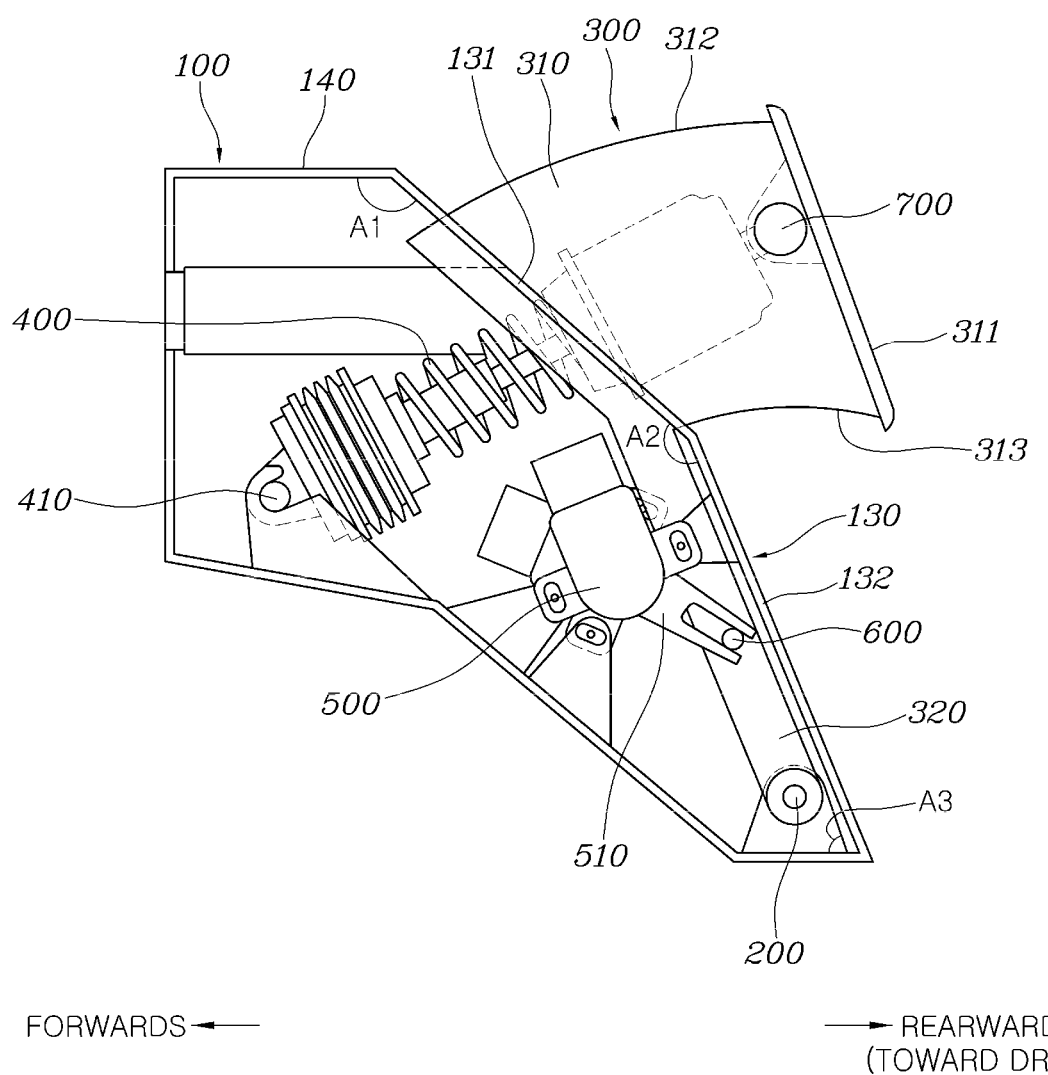
FIG. 2 is a side cross-sectional view of FIG. 1, in which a pad part is projected rearwards when a pedal pad is rotated rearwards.
Figure 3:
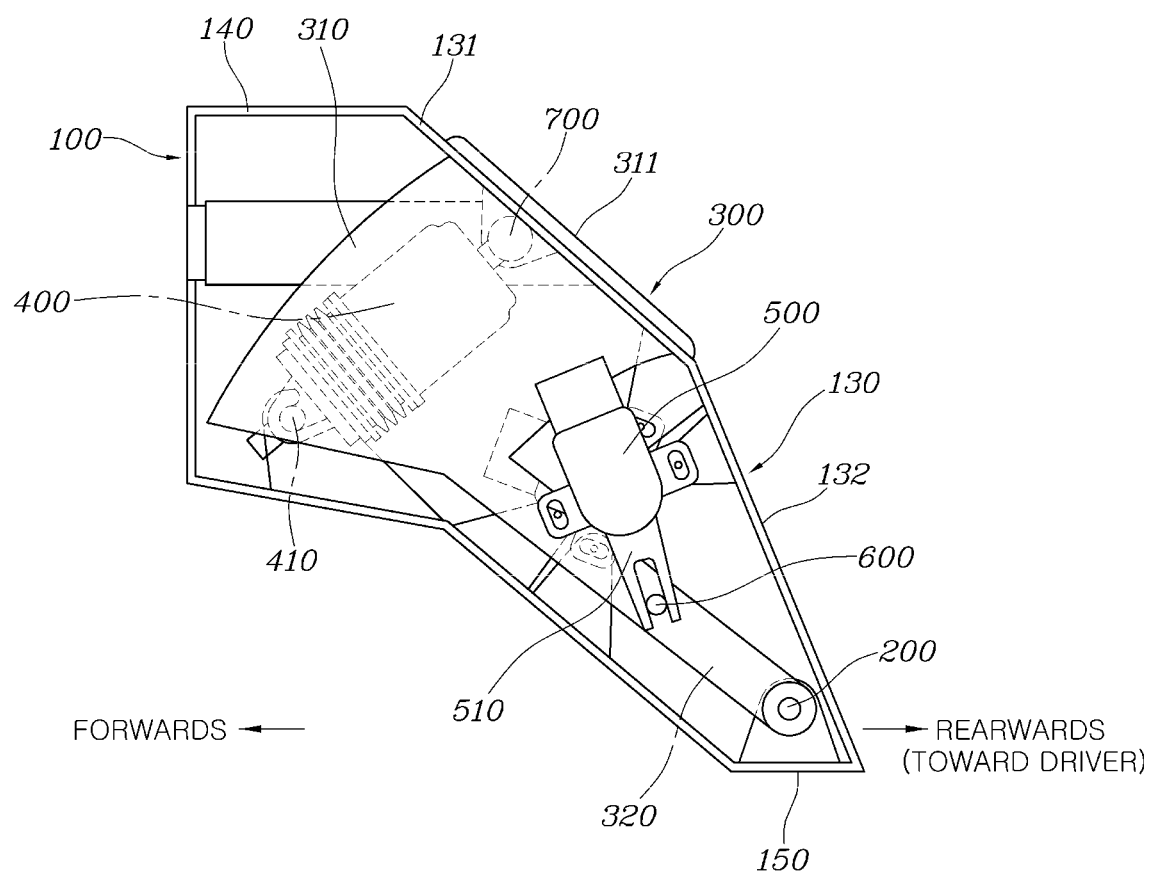
FIG. 3 is a side cross-sectional view of FIG. 1, in which the pad part is inserted into a pedal housing from the position shown in FIG. 2 when the pedal pad is rotated forwards.
Figure 4:
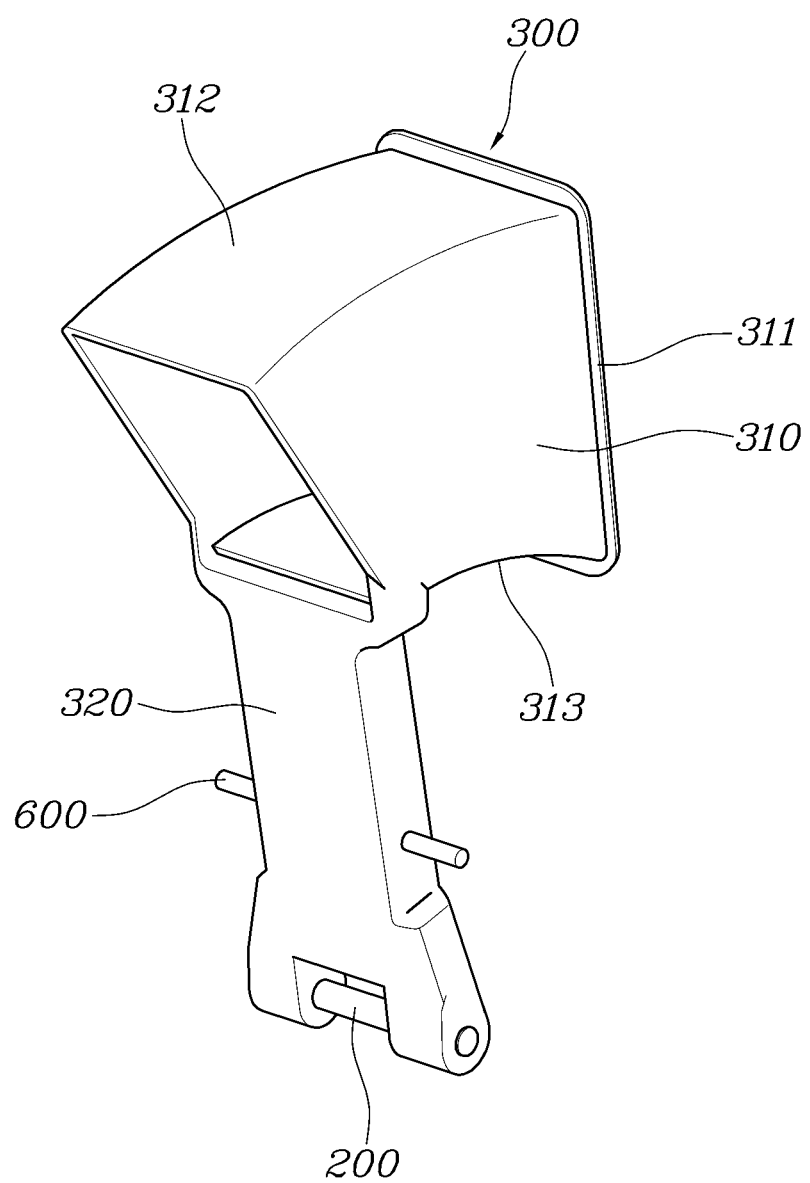
FIG. 4 is a perspective view of the pedal pad according to another form of the present disclosure.
Figure 5:
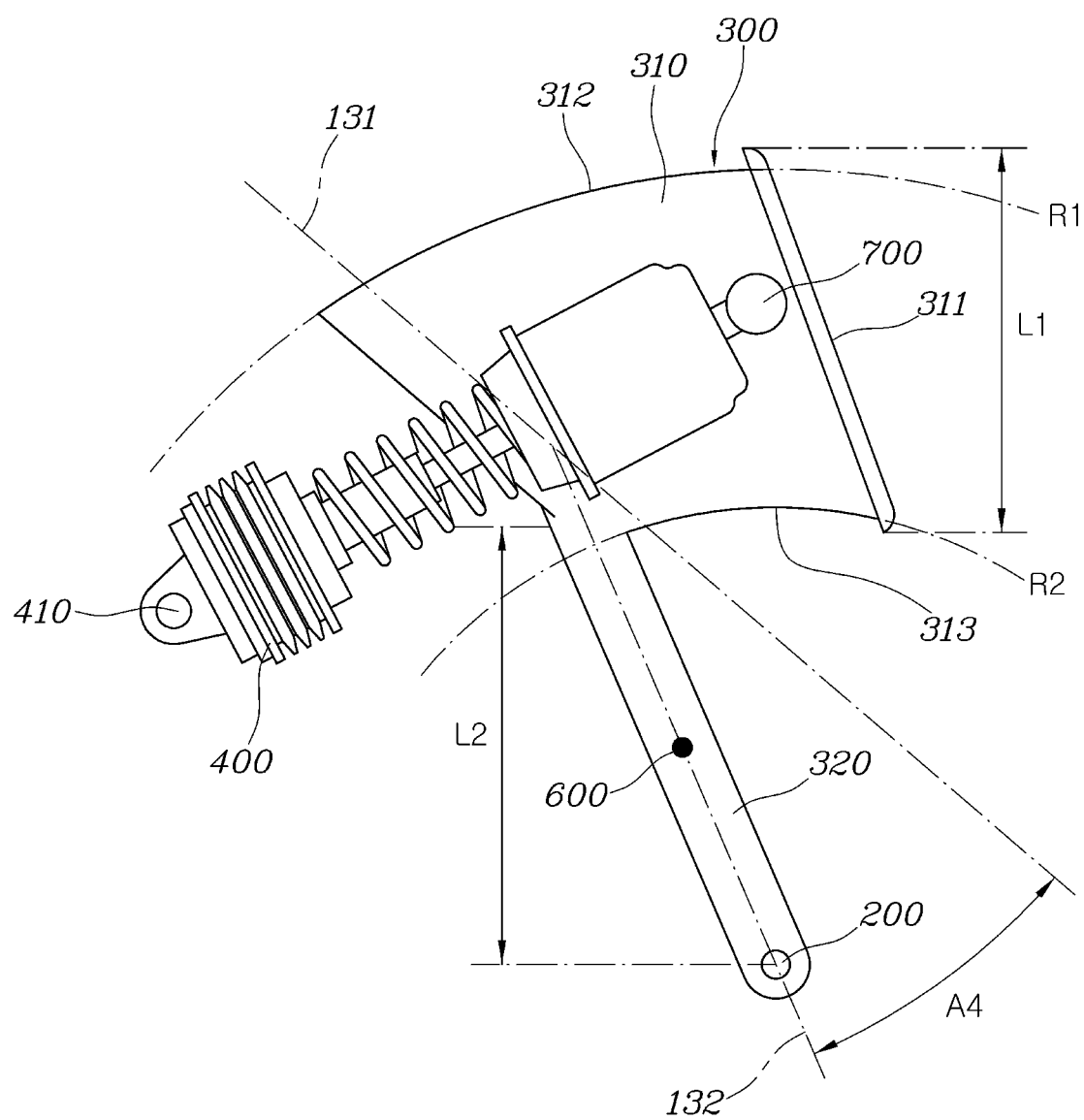
FIG. 5 is a side view of the pedal pad in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions of exemplary forms of the present disclosure disclosed herein are only for purposes of illustration of the forms of the present disclosure. The present disclosure may be embodied in many different forms without departing from the spirit and significant characteristics of the present disclosure. Therefore, the forms of the present disclosure are disclosed only for illustrative purposes, and should not be construed as limiting the present disclosure.

Reference will now be made in detail to various forms of the present disclosure, specific examples of which are illustrated in the accompanying drawings and described below, since the forms of the present disclosure can be variously modified in many different forms. While the present disclosure will be described in conjunction with exemplary forms thereof, it is to be understood that the present description is not intended to limit the present disclosure to those exemplary forms. On the contrary, the present disclosure is intended to cover not only the exemplary forms, but also various alternatives, modifications, equivalents and other forms that may be included within the spirit and scope of the present disclosure as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

The terminology used herein is for the purpose of describing particular forms only and is not intended to be limiting. As used herein, the singular forms "a," "an" and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this present disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to an exemplary form of the present disclosure may be embodied by non-volatile memory (not shown) configured to store an algorithm configured to control the operation of various components of a vehicle or data relating to software instructions for executing the algorithm and a processor (not shown) configured to perform operations, which will be described below, using the data stored in the memory. Here, the memory and the processor may be embodied by separate chips. Alternatively, the memory and the processor may be embodied by a single chip in which the memory and the processor are integrated with each other. The processor may include one or more processors.

Reference will now be made in detail to the exemplary forms of the present disclosure, examples of which are illustrated in the accompanying drawings. Wherever possible, the same reference numbers will be used throughout the drawings to refer to the same or like parts.

Hereinafter, an organ-type electronic brake pedal apparatus according to one form of the present disclosure will be described with reference to the accompanying drawings.

As illustrated in FIGS. 1 to 5, the organ-type electronic brake pedal apparatus according to some forms of the present disclosure includes: a pedal housing 100 fixedly mounted on a floor in the space under a driver seat, a pedal pad 300, which is coupled at the lower end thereof to the pedal housing 100 via a hinge pin 200 so as to be rotatable forward and backward and has a pad surface 311 adapted to be manipulated by a driver's foot, and a high-load spring module 400, which is rotatably coupled at the two ends thereof both to the pedal housing 100 and to the pedal pad 300 so as to realize resisting force corresponding to depression force upon manipulation of the pedal pad 300.

The pedal housing 100 has the form of a hollow box so as to accommodate the high-load spring module 400, a pedal sensor to be described later and the like in the internal space thereof. Covers 110 are detachably coupled to the two lateral sides of the pedal housing 100.

The pad surface 311 of the pedal pad 300 is spaced apart upwards from the hinge pin 200. When the pedal pad 300 is rotated about the hinge pin 200 rearwards and is projected from the pedal housing 100, only the portion near the pad surface 311 of the pedal pad 300 is projected from the pedal housing 100, such that the driver cannot depress the remaining region of the pedal pad 300 other than the pad surface 311.

The brake pedal apparatus according to another form of the present disclosure further includes a plurality of pedal sensors 500, which are fixedly mounted in the pedal housing 100 and are connected to the pedal pad 300 so as to generate a signal pertaining to braking upon rotation of the pedal pad 300.

The pedal sensor 500 includes a sensor lever 510 rotatably coupled thereto, and the sensor lever 510 is connected to a sensor pin 600 coupled to the pedal pad 300. When the pedal pad 300 is rotated with respect to the pedal housing 100, the sensor lever 510 is also rotated via the sensor pin 600.

The sensor lever 510 is provided with a permanent magnet coupled thereto, and the pedal sensor 500 is provided therein with a PCB (Printed Circuit Board), which is positioned so as to face the permanent magnet. The PCB is electrically connected to a power supply, such as a battery, via a wire.

When the pedal pad 300 is depressed and manipulated by a driver's foot and the pedal pad 300 is thus rotated with respect to the pedal housing 100, the sensor lever 510, which is coupled to the sensor lever 510 via the sensor pin 600, is rotated. As the sensor lever 510 is rotated, the position of the permanent magnet coupled to the sensor lever 510 is changed, and the pedal sensor 500 detects the manipulation of the pedal pad 300 through variation in the intensity of a magnetic field due to the positional variation of the permanent magnet, and generates the signal pertaining to braking.

Although the pedal sensor 500 is a contact-type pedal sensor, which is connected to the pedal pad 300 via the sensor lever 510 and which has a mechanical structure, the pedal sensor 500 may also be a non-contact-type pedal sensor, which is composed only of a permanent magnet and a PCB, as necessary.

In another form, the pedal pad 300 includes a box-shaped pad part 310, which is provided with the pad surface 311 and an opening through which one end of the high-load spring module 400 is inserted so as to be rotatably coupled to the pedal pad 300, and a pedal arm part 320, which extends from the pad part 310 at a predetermined angle and is coupled at the lower end thereof to the hinge pin 200.

When viewed from a lateral side, the pad part 310 and the pedal arm part 320 may be configured to have an L shape.

According to another form of the present disclosure, the sensor pin 600 is coupled to the pedal arm part 320 at a position between the pad part 310 and the hinge pin 200, and is coupled to the sensor lever 510 of the pedal sensor 500.

Since the sensor pin 600 is coupled to the pedal arm part 320, the pedal sensor 500 may be positioned close to the pedal arm part 320, thus reducing the overall size of the brake pedal apparatus.

The pad part 310 is configured such that only the front face thereof, through which the high-load spring module 400 is inserted, is open but the remaining area thereof is closed so as to prevent contaminants from entering the same.

The one end of the high-load spring module 400 is inserted into the pad part 310 and is rotatably coupled to the pad part 310 via a spring pin 700, and the other end of the high-load spring module 400 is rotatably coupled to the front surface of the pedal housing 100 via a spring protrusion 410.

The high-load spring module 400 is obliquely positioned in the direction in which the pad part 310 is moved.

Generally, brake pedals for a vehicle require a high operating force for the purpose of distinguishing the same from an acceleration pedal and safety in manipulation thereof. To this end, since the form of the present disclosure employs the high-load spring module 400 in order to realize resisting force corresponding to depression force, there are advantages in that it is possible to adopt a low-capacity motor, which is used in a general foldable acceleration pedal apparatus, and it is thus possible to reduce manufacturing costs.

The high-load spring module 400 may include two or more springs and two or more dampers, which are generally connected to each other in series, in order to realize a desired resisting force corresponding to depression force.

In the pedal pad 300, the lower end of the pedal arm part 320 is coupled to the hinge pin 200 so as to be forward and backward rotatable about the hinge pin 200 such that the pad part 310, which is spaced apart upwards from the hinge pin 200, is inserted into the housing hole 120 formed in the pedal housing 100 when the pedal arm part 320 is rotated forwards, and is projected from the pedal housing 100 rearwards toward the driver when the pedal arm part 320 is rotated rearwards.

The upper surface 312 and the lower surface 313 of the pad part 310 are formed so as to have arc shapes, which are respectively the same as sections of circles having radii of rotation around the hinge pin 200. Consequently, since the gap between the pad part 310 and the periphery of the housing hole 120 formed in the pedal housing 100 is maintained constant, there is an advantage in that the introduction of contaminants is of maximally prevented.

The pad part 310 is disposed in the housing hole 120 formed in the pedal housing 100 so as to be inserted into or projected from the pedal housing 100 when the pedal pad 300 is rotated. The pedal arm part 320 is always positioned in the pedal housing 100 regardless of rotation of the pedal arm part 320 so as to avoid interference with the driver.

Accordingly, when the driver manipulates the pedal pad 300 using his/her foot, the driver can manipulate only the pad surface 311 of the pad part 310 that is exposed from the pedal housing 100 but cannot manipulate the pedal arm part 320 because the pedal arm part 320 is positioned in the pedal housing 100 so as to prevent contact with the driver's foot, thereby preventing incorrect operation by the driver.

According to one form of the present disclosure, the rear surface 130 of the pedal housing 100 includes an upper sloped surface, which is inclined downwards at a predetermined angle from the upper surface 140 and is provided therein with the housing hole 120 through which the pad part 310 extends, and a lower sloped surface 132, which is inclined downwards at a predetermined angle from the lower end of the upper sloped surface 131 and is connected to the bottom surface 150 of the pedal housing 100.

The upper sloped surface 131 is connected to the upper surface 140 at an obtuse angle A1, and the lower sloped surface 132 is connected to the upper sloped surface 131 at an obtuse angle A2 and is connected to the bottom surface 150 at an acute angle A3. Consequently, since the lower sloped surface 132 of the pedal housing 100 is inclined forwards, the driver can manipulate the pad part 310 not only by rotating his/her foot but also by moving his/her foot forwards.

Furthermore, the pedal arm part 320 is connected to the pad part 310 such that the pedal arm part 320 is inclined at the same angle as the angle of the lower sloped surface 132 of the pedal housing 100 so as to be parallel to the lower sloped surface 132 when the pedal pad 300 is rotated rearwards and the pad part 310 is thus projected from the pedal housing 100 (the state shown in FIG. 2) and such that the pedal arm part 320 defines an acute angle A4 relative to the upper sloped surface 131 of the pedal housing 100 when the pedal pad 300 is rotated in the state in which the one end of the high-load spring module 400 disposed in the pad part 310 does not interfere with the pad part 310.

Although the pedal arm part 320 may be connected to the pad part 310 such that the included angle between the pedal arm part 320 and the upper sloped surface 131 is an angle of, for example, 45 degrees or less, the present disclosure is not limited thereto.

As the included angle A4 between the upper sloped surface 131 and the pedal arm part 320 increases, the distance that the pedal arm part 320 is moved forwards toward the dashboard increases, and thus the inclination of the lower sloped surface 132 of the pedal housing 100 increases. Accordingly, since the contact between the driver's foot and the lower sloped surface 132 is prevented when the pad part 310 is manipulated by forward movement of the driver's foot, it is possible to manipulate the organ-type pedal pad like a pendant-type pedal pad.

However, when the included angle A4 further increases to an obtuse angle, the one end of the high-load spring module 400 disposed in the pad part 310 interferes with the pad part 310, thereby making it impossible to perform the fundamental manipulation of the pedal pad 300. Therefore, the pad part 310 may be connected to the pedal arm part 320 such that the included angle A4 is an angle of 45 degrees or less.

Figure 6:
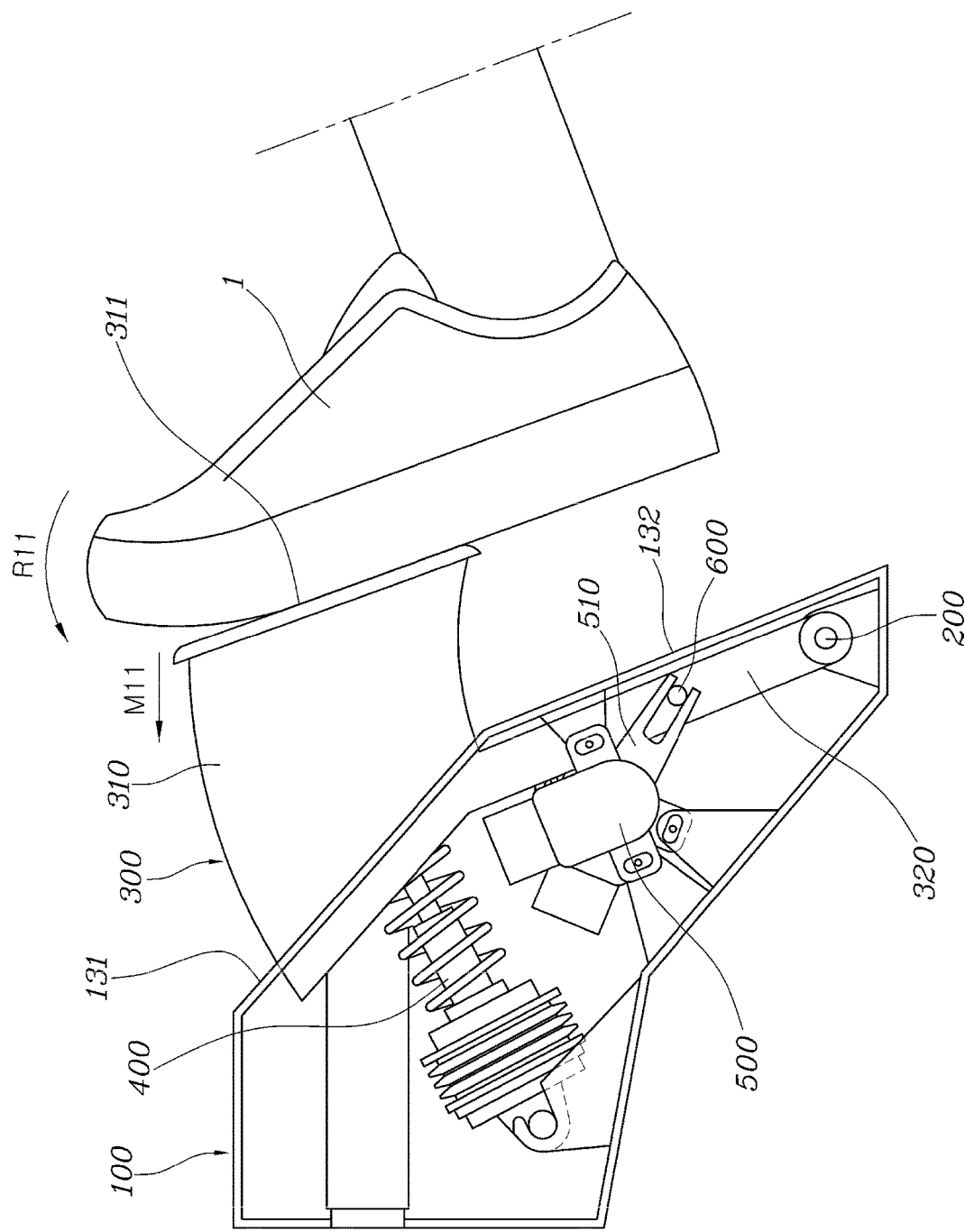
FIGS. 6 and 7 are views illustrating the brake pedal apparatus in some forms of the present disclosure, which is manipulated in different operation manner by a driver.
Figure 7:
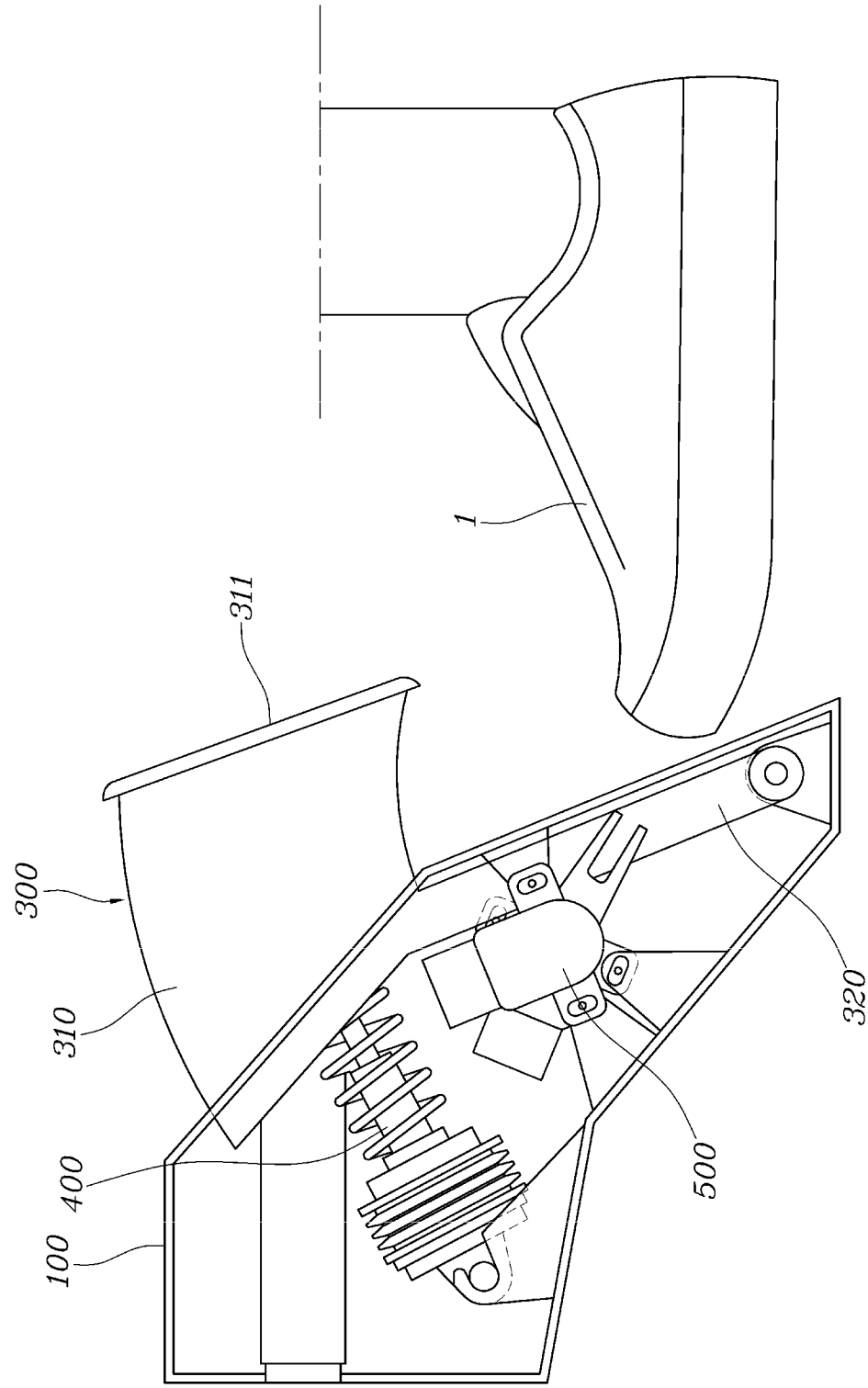

As illustrated in FIG. 6, the organ-type brake pedal apparatus according to one form of the present disclosure may be constructed such that the pedal pad 300 is manipulated by rotating the driver's foot forwards (R11) while the driver's foot 1 is placed on the pad surface 311 as in the case of an organ-type pedal pad.

Furthermore, the organ-type pedal pad 300 may be manipulated by pushing the driver's foot forwards (M11) while the driver's foot 1 is placed on the pad surface 311 as in the case of a pendant-type pedal pad. As a result, it is possible to allow the driver to reliably manipulate the pad, and it is possible to prevent incorrect operation of the pedal pad 300 by the driver.

Since the lower sloped surface 132 of the pedal housing 100 is bent forwards at the lower end of the upper sloped surface 131, the drivers' foot does not come into contact with the lower sloped surface 132 even when the driver pushes the pedal pad 300 forwards using his/her foot while the driver's foot 1 is placed on the pad surface 311. As a result, since the drivers' foot is allowed to move forwards, it is possible for the driver to push the organ-type pedal pad 300 like a pendant-type pedal pad.

Meanwhile, even when the driver tries to manipulate the pedal arm part 320, which is positioned under the pad surface, that is, close to the hinge pin 200, using his/her toe in order to manipulate the organ-type pedal pad 300 without manipulating the pad surface 311 using his/her foot as in a pendant-type pedal pad, the driver's foot is prevented from coming into contact with the pedal arm part 320. Therefore, since manipulation of the pedal pad 300 is prevented, there is an advantage of preventing incorrect operation of the pedal pad 300.

As is apparent from the above description, the organ-type electronic brake pedal apparatus according to the present disclosure enables the driver to manipulate the pedal pad by pushing the pedal pad by rotation of his/her foot forwards as in an organ-type pedal pad or to manipulate the pedal pad by pushing the pedal pad by stretching his/her foot forwards as in a pendant-type pedal pad. Accordingly, it is possible to improve reliability of operation of the pedal pad by the driver, and it is possible to prevent incorrect operation of the pedal pad.

In addition, even when the driver tries to manipulate the pedal arm part, which is positioned close to the hinge pin of the pedal pad, as in a pendant-type pedal pad, the pedal arm part is not manipulated because the pedal arm part is shielded by the pedal housing. Accordingly, there is an advantage in that it is possible to prevent manipulation of the pedal pad and it is thus possible to eliminate the risk of unintentional manipulation of the pedal pad.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. An organ electronic brake pedal apparatus comprising:
    a pedal housing configured to be fixedly mounted in a space under a driver seat;
    a pedal pad including: a lower end coupled to the pedal housing via a hinge pin such that the pedal pad is rotatable forward and backward, and a pad surface adapted to be manipulated by a driver; and
    a spring module including: a first end rotatably coupled to the pedal housing, and a second end rotatably coupled to the pedal pad, the spring module configured to realize a resisting force corresponding to a force applied to the pedal pad,
    wherein the pad surface is spaced apart upwards from the hinge pin, and
    wherein the pedal pad includes:
        a pad part including: the pad surface, and an opening through which the second end of the spring module is inserted and rotatably coupled to the pad part; and
        a linear pedal arm part configured to extend from the pad part and including a lower end coupled to the hinge pin.
2. The organ electronic brake pedal apparatus according to claim 1, further comprising: a plurality of pedal sensors, which are fixedly mounted on the pedal housing and are connected to the pedal pad, the plurality of pedal sensors configured to generate signals pertaining to braking upon rotation of the pedal pad.

3. The organ electronic brake pedal apparatus according to claim 1, wherein a sensor pin is coupled to the linear pedal arm part at a position between the pad part and the hinge pin, and the sensor pin is coupled to sensor levers of the plurality of pedal sensors.

4. The organ electronic brake pedal apparatus according to claim 1, wherein the opening of the pad part is disposed only at a front face thereof, and the pad part is closed at a remaining area thereof so as to prevent introduction of contaminants.

5. The organ electronic brake pedal apparatus according to claim 1, wherein upper and lower surfaces of the pad part are formed so as to have arc shapes, which are respectively the same as sections of circles having radii of rotation around the hinge pin.

6. The organ electronic brake pedal apparatus according to claim 1, wherein the pad part is configured to extend through a housing hole formed in the pedal housing so as to be inserted into or projected from the pedal housing when the pedal pad is rotated, and wherein the linear pedal arm part is positioned inside the pedal housing regardless of rotation of the pedal pad so as to avoid contact with the driver.

7. The organ electronic brake pedal apparatus according to claim 1, wherein the pedal pad is constructed such that a vertical length between an axis of the hinge pin and an upper end of the linear pedal arm part is greater than a vertical length of the pad part.

8. The organ electronic brake pedal apparatus according to claim 1, wherein a rear surface of the pedal housing includes:

an upper sloped surface, which is bent downwards at a rear end of an upper surface of the pedal housing at a predetermined angle and has formed therein a housing hole through which the pad part extends; and a lower sloped surface, which is inclined at a lower end of the upper sloped surface at a predetermined angle and is connected to a bottom surface of the pedal housing, and wherein the upper sloped surface is connected to the upper surface at an obtuse angle, and the lower sloped surface is connected to the upper sloped surface at an obtuse angle and is connected to the bottom surface at an acute angle.

9. The organ electronic brake pedal apparatus according to claim 8, wherein:

the linear pedal arm part is connected to the pad part, when the pedal pad is rotated rearwards and the pad part is thus projected from the pedal housing, the linear pedal arm part is inclined at an angle equal to an angle of the lower sloped surface so as to be parallel to the lower sloped surface, and the linear pedal arm part is configured to form an acute angle relative to the upper sloped surface when the pedal pad is rotated in a state in which the second end of the spring module disposed in the pad part does not interfere with the pad part.

10. The organ electronic brake pedal apparatus according to claim 9, wherein the linear pedal arm part is connected to the pad part such that an included angle between the linear pedal arm part and the upper sloped surface is an angle of 45 degrees or less.

\* \* \* \* \*